United States Patent
Chou (10) Patent No.: US 12,542,956 B2
(45) Date of Patent: Feb. 3, 2026

(54) IMAGING MODULE AND IMAGING DEVICE

(71) Applicant: TRIPLE WIN TECHNOLOGY (SHENZHEN) CO.LTD., Shenzhen (CN)

(72) Inventor: Yuan-Hsu Chou, NewTaipei (TW)

(73) Assignee: TRIPLE WIN TECHNOLOGY (SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 18/674,718

(22) Filed: May 24, 2024

(65) Prior Publication Data

US 2025/0203179 A1    Jun. 19, 2025

(30) Foreign Application Priority Data

Dec. 15, 2023 (CN) .................. 202311736262.X (51) Int. Cl.
*H04N 23/11* (2023.01)

(52) U.S. Cl.
CPC ................. *H04N 23/11* (2023.01)

(58) Field of Classification Search
CPC ........................................ H04N 23/11
USPC .......................................... 348/164
See application file for complete search history.

(56) References Cited

U.S. PATENT DOCUMENTS

| | | | |
|---|---|---|---|
| 2011/0079714 A1* | 4/2011 | McEldowney | G01J 3/02 250/226 |
| 2011/0316983 A1* | 12/2011 | Hiramoto | G03B 35/08 348/E13.074 |
| 2013/0107009 A1* | 5/2013 | Hiramoto | H04N 13/204 348/46 |
| 2013/0147926 A1* | 6/2013 | Hiramoto | H04N 13/257 348/49 |
| 2013/0342661 A1* | 12/2013 | Ishii | G03B 35/10 348/49 |
| 2017/0142406 A1* | 5/2017 | Ovsiannikov | G01B 11/2527 |
| 2017/0215711 A1* | 8/2017 | Kobayashi | A61B 1/0638 |
| 2019/0346774 A1* | 11/2019 | Maeda | G02B 26/023 |
| 2020/0177781 A1* | 6/2020 | Numata | H04N 23/55 |
| 2021/0014416 A1* | 1/2021 | Kim | G02B 27/644 |
| 2022/0256128 A1* | 8/2022 | Feng | H04N 23/54 |
| 2024/0064392 A1* | 2/2024 | Lee | H04N 23/00 |

* cited by examiner

*Primary Examiner* — Kathleen M Walsh
(74) *Attorney, Agent, or Firm* — ScienBiziP, P.C.

(57) ABSTRACT

An imaging module including a lens for emitting signal light, a filter, a driving element, and an image generating component. The filter includes first filtering units and second filtering units. Each first filtering unit is alternately connected with one second filtering unit in a direction perpendicular to an optical axis of the lens. Each first filtering units is used to transmit light in a first wavelength band in the signal light, and each second filtering units is used to transmit light in a second wavelength band in the signal light. The driving element is used to drive the filter to shift. The image generating component is used to generate a first target image based on the light in the first wavelength band, or generate a second target image based on the light in the second wavelength band. An imaging device is also provided.

16 Claims, 8 Drawing Sheets

IMAGING MODULE AND IMAGING DEVICE

FIELD

The subject matter herein generally relates to display technology, and particularly relates to an imaging module and an imaging device including the imaging module.

BACKGROUND

A conventional imaging module includes two filters side by side. One of the two filters is a fully transparent filter that allows infrared radiation to pass through, and the other one of the two filters is an infrared filter that can filter out infrared radiation. By moving the two filters, different filters can be switched to an output light path of a lens in the imaging module according to different occasions.

The imaging module forms a movement space for switching the two filters. Therefore, a volume of the imaging module including the two filters is twice that of an imaging module including only one filter. Besides, frequent switching of the two filters may generate noise and increase a failure risk of the imaging module.

Therefore, there is room for improvement within the art.

BRIEF DESCRIPTION OF THE DRAWINGS

Implementations of the present disclosure will now be described, by way of embodiment, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

"Above" means one layer is on top of another layer. In one example, it means one layer is situated directly on top of another layer. In another example, it means one layer is situated over the second layer directly or indirectly with more layers or spacers in between.

When a feature or element is herein referred to as being "on" another feature or element, it can be directly on the other feature or element or intervening features and/or elements may also be present. It will also be understood that, when a feature or element is referred to as being "connected", "attached" or "coupled" to another feature or element, it can be directly connected, attached, or coupled to the other feature or element or an intervening features or elements may be present.

Figure 1:
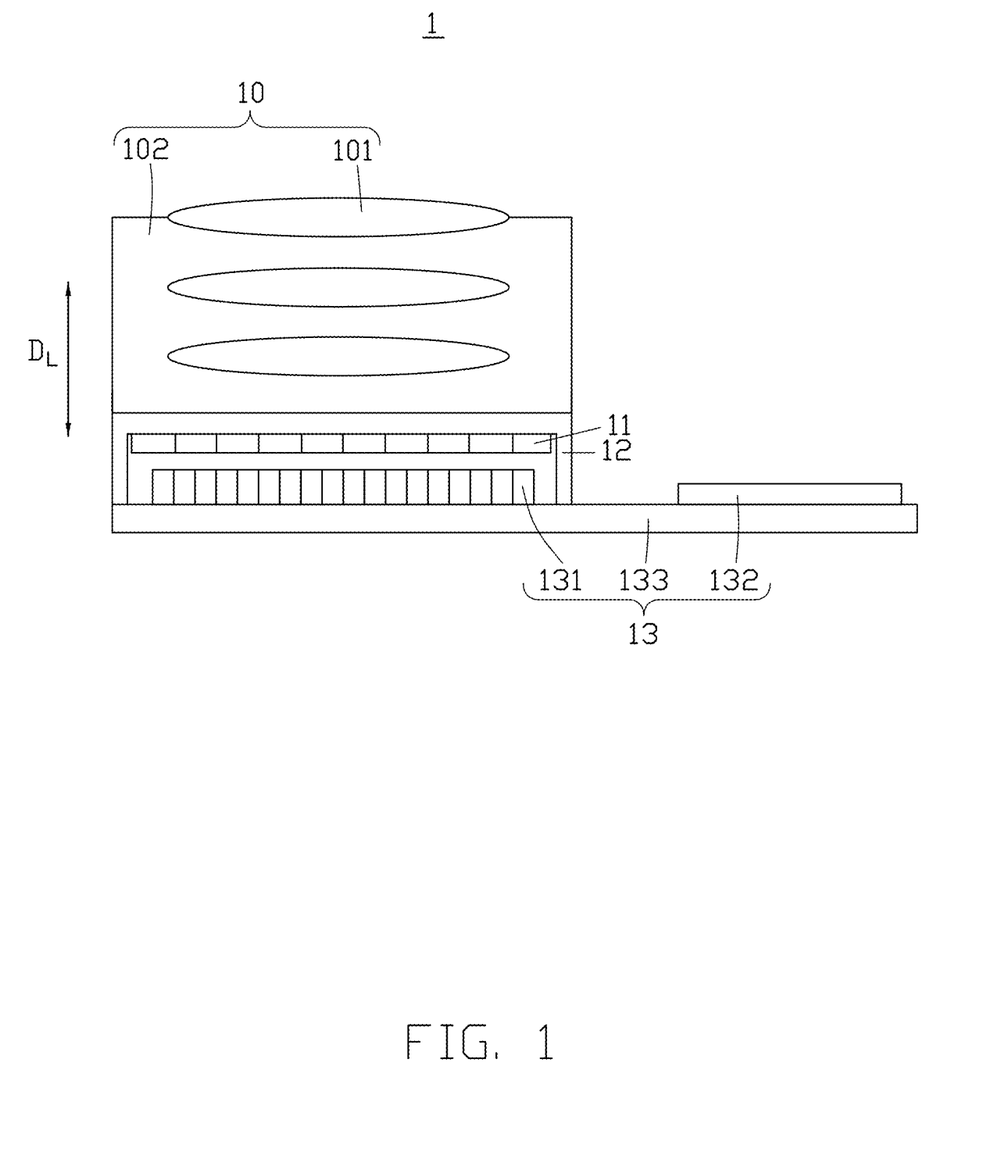
FIG. 1 shows a cross-sectional structure of an imaging module according to an embodiment of the present disclosure.

As shown in FIG. 1, an imaging module 1 provided in the present embodiment includes a lens 10, a filter 11, a driving element 12, and an image generating component 13. The driving element 12 is a frame structure between the lens 10 and the photosensitive element 13. The center of the driving element 12 is used to fix the filter 11. The image generating component 13 is on a side of the driving element 12 away from the lens 10.

In this embodiment, the lens 10 includes one or more lenses 101 and a bracket 102 loaded with the lenses 101. The lenses 101 are used to receive external ambient light, refract and focus the ambient light to form signal light. Each lens 101 can be glass or plastic lens. The glass lens is wear-resistant, scratch resistant, and have good optical performance and stability, which can accurately capture and transmit images. Common glass materials include quartz glass, optical glass, and ordinary glass. The plastic lens is lightweight and have low cost, but not as stable as the glass lens. Different materials of lenses 101 are chosen according to different occasions, which can improve an effectiveness of the imaging module 1. The bracket 102 is in a sleeve shape, and the lens 101 are inside the bracket 102.

Figure 2:
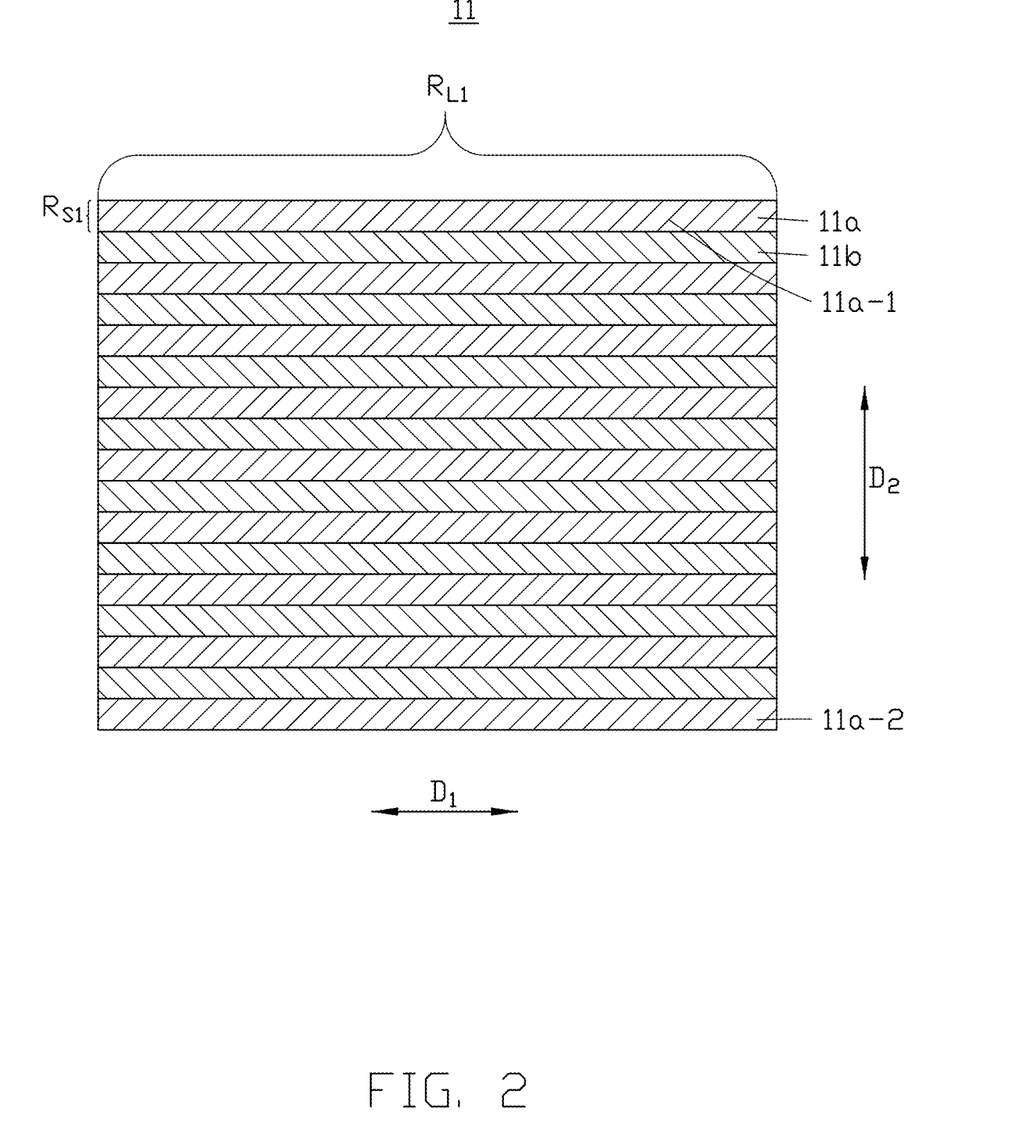
FIG. 2 is a planar view of a filter of the imaging module shown in FIG. 1.

As shown in FIG. 1 and FIG. 2, the filter is on an emission side of the signal light. That is, the lens 10 is used to guide the signal light to the filter 11, and the filter 11 is on a light path of the signal light. The filter 11 is sheet shaped and has a rectangular planar structure. That is, a surface of the filter 11 for receiving the signal light and perpendicular to an optical axis $D_L$ of the lens 10 is rectangular.

In this embodiment, the filter 11 includes a plurality of first filtering units 11a and a plurality of second filtering units 11b. A number of the first filtering units 11a and a number of the second filtering units 11b are the same or differs by one. Each first filtering unit 11a alternately connected with one second filtering units 11b. Each first filtering unit 11a and each second filtering unit 11b is rectangular. That is, surfaces of each first filtering unit 11a and each second filtering unit 11b have a rectangular planar structure. In this embodiment, the first filtering units 11a and the second filtering units 11b have a same size of edge side and a same size of long side.

In this embodiment, each first filtering unit 11a and each second filtering unit 11b have a first long side $R_{L1}$ and a first short side $R_{S1}$. The first long side $R_{L1}$ extents along a first direction $D_1$, and the first short side $R_{S1}$ extents along a second direction $D_2$. The first direction $D_1$ and the second direction $D_2$ are both perpendicular to an optical axis $D_L$ of the signal light (That is, the optical axis of the lens 10), and the first direction $D_1$ and the second direction $D_2$ are perpendicular to each other. Each first filtering unit 11a alternate with one second filtering unit 11b along the second direction $D_2$. That is, the first long edge $R_{L1}$ of each first filtering unit 11a is connected to the first long edge $R_{L1}$ of the adjacent second filtering unit(s) 11b, and the first long edge $R_{L1}$ of each second filtering unit 11b is connected to the first long edge $R_{L1}$ of the adjacent first filtering unit(s) 11a.

In this embodiment, a surface of the filter 11 for receiving the ambient light has a rectangular planar structure with long and short edges. In other embodiments of the present disclosure, the surface of the filter 11 may have other shapes of planar structures, such as a square planar structure, a parallelogram planar structure, etc. In this embodiment, the surfaces of each first filtering unit 11a and each second filtering unit 11b has the rectangular planar structure. In other embodiments of the present disclosure, the surfaces of each first filtering unit 11a and each second filtering unit 11b may have other shapes of planar structures, such as square planar structures, parallelogram planar structures, etc. That is, the shapes of the planar structures of the surfaces of each first filtering unit 11a and each second filtering unit 11b are adapted to the shape of the of the planar structure of the surface of the filter 11.

Each first filtering unit 11a is used for transmitting light having a wavelength in a first wavelength band in the signal light, and each second filtering unit 11b is used for transmitting light having a wavelength in a second wavelength band in the signal light, wherein the first wavelength band and the second wavelength band do not overlap. In this embodiment, each first filtering unit 11a is an infrared filtering unit used for transmitting infrared light in the first wavelength band of 750 nm to 1000 nm, and each second filtering unit 11b is a visible filtering unit used for transmitting visible light in the second wavelength band of 380 nm to 750 nm.

The driving element 12 can be a voice coil motor (VCM), which works by changing a DC current of a coil in a permanent magnetic field to control a stretching position of a spring plate below the coil, thereby driving the VCM to move. That is, a displacement is achieved by using an electromagnetic induction phenomenon.

In this embodiment, the filter 11 and the driving element 12 are fixed together, and the driving element 12 is used to synchronously drive the filter 11 to move back and forth along the second direction $D_2$ through its own displacement, so that the filter 11 can switch back and forth between two positions. In this embodiment, the imaging module 1 works in multiple photosensitive periods, with one interval period between each adjacent two photosensitive periods. During each photosensitive period, the driving element 12 is used to remain stationary, so that the filter 11 remains in a position. During each interval period, the driving element 12 is used to drive the filter 11 to move in one direction by a distance equal to a length of the first short side $R_{S1}$, thereby switching the filter 11 to another position. The driving element 12 moves in opposite directions during two adjacent interval periods, causing the filter 11 to switch back and forth between the two positions.

As shown in FIG. 1, the image generating component 13 includes a photosensitive element 131, a processing device 132, and a printed circuit board 133. The photosensitive element 131 and the processing device 132 are on a same surface of the printed circuit board 133 and are electrically connected to each other through the printed circuit board 133. The photosensitive element 131 is on the light path of the signal light and is used to receive light in the first wavelength band and the second wavelength band. In this embodiment, the photosensitive element 131 is on a side of the filter 11 away from the lens 10 and is electrically connected to the printed circuit board 133. The photosensitive element 131 is used to convert the received light in the first wavelength band and the second wavelength band into electrical signals. The processing device 132 is used to receive the electrical signal through the printed circuit board 133 and generate an image based on the electrical signal.

Figure 3:
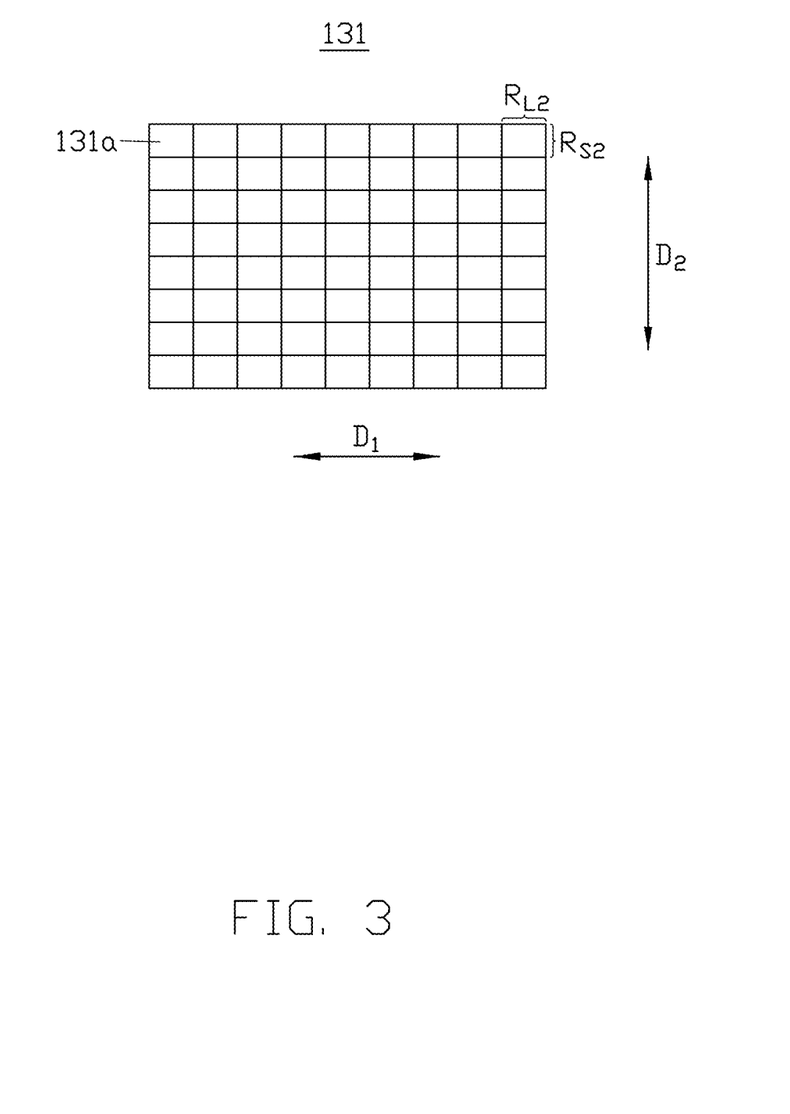
FIG. 3 is a planar view of a photosensitive element of the imaging module shown in FIG. 1.

As shown in FIG. 3, the photosensitive element 131 includes a plurality of pixel units 131a, each of the pixel unit 131a is rectangular and includes a second long side $R_{L2}$ and a second short side $R_{S2}$. A length of the second long side $R_{L2}$ and a length of the second short side $R_{S2}$ may be the same or different. The second long side $R_{L2}$ extends along the first direction $D_1$ and the second short side $R_{S2}$ extends along the second direction $D_2$. The pixel units 131a are arranged into a pixel array including multiple rows along the first direction $D_1$ and multiple columns along the second direction $D_2$.

In this embodiment, a surface of the photosensitive element 131 for receiving the signal light has a rectangular planar structure with long and short sides. In other embodiments, the surface of the photosensitive element 131 may have other shapes of planar structures, such as a square planar structure, a parallelogram planar structure, etc. The length of the short side of the photosensitive element 131 is smaller than that of the short side of the filter 11, and the length of the long side of the photosensitive element 131 is the same as that of the long side of the filter 11, thereby ensuring the photosensitive element 131 can receive light in the first wavelength band and the second wavelength band transmitted by the filter 11. The short side of the photosensitive element 131 corresponds to the short side of the filter 11, and the long side of the photosensitive element 131 corresponds to the long side of the filter 11. That is, the short side of the photosensitive element 131 is parallel to the short side of the filter 11, and the long side of the photosensitive element 131 is parallel to the long side of the filter 11. The length of the first short side $R_{S1}$ is an integer multiple of the length of the second short side $R_{S2}$.

Figure 4:
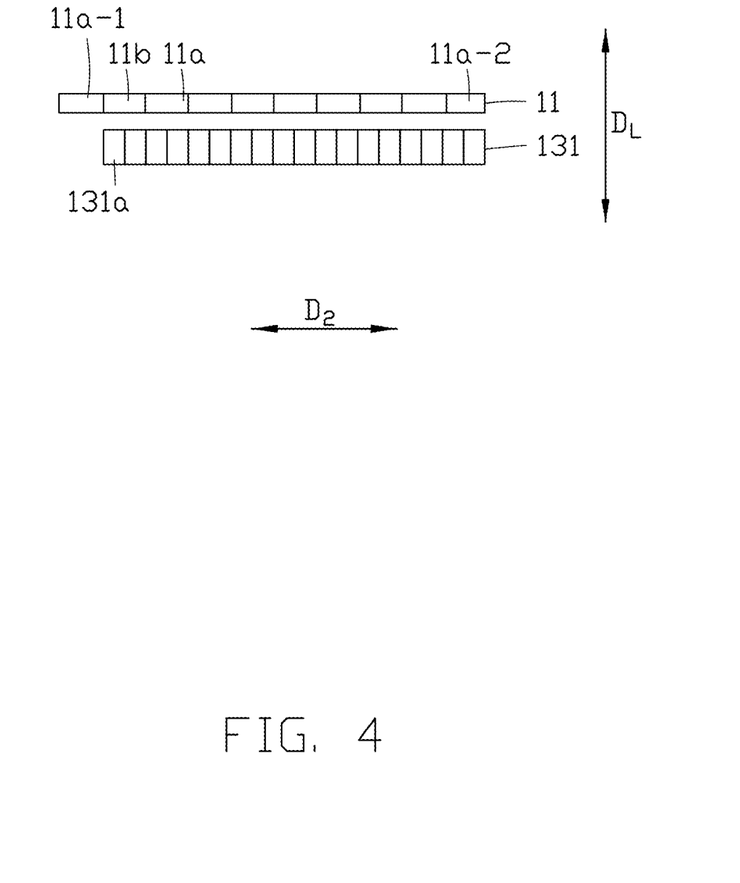
FIG. 4 shows a corresponding relationship between the filter and the photosensitive element when the filter on a first position.

As shown in FIG. 4, in at least one embodiment, each row of pixel units 131a are used to receive the signal light from one first filtering unit 11a or one second filtering unit 11b of the filter 11. in at least one embodiment, each row group of adjacent multiple rows (including two rows) multiple (including two) rows adjacent to each other of pixel units 131a are used to receive the signal light from one first filtering unit 11a or one second filtering unit 11b of the filter 11. That is, the signal light emitted by each first filtering unit 11a and each second filtering unit 11b is respectively received by the corresponding row(s) of pixel units 131a. In FIG. 4 of this present embodiment, the signal light emitted from each first filtering unit 11a and each second filtering unit 11b is received by the corresponding two rows of pixel units 131a, respectively.

The photosensitive element 131 can be a charge coupled device (CCD) or a complementary metal oxide semiconductor (CMOS). The CCD components have a low noise level, a high dynamic range, and a good image quality. The CCD is used to convert light into charges, store the charges, transfer the charges into digital signals, thereby outputting digital image. The CMOS element have a low power consumption, a high integration, and a low production cost. The CMOS element is used to convert light into electrical signals and directly output digital image, achieving a fast data reading speed.

As shown in FIG. 4, when the filter 11 is in a first position, a right side of the first filtering unit 11a-2 is aligned with a right side of the photosensitive element 131, and a right side of the first filtering unit 11a-1 is aligned with a left side of the photosensitive element 131. That is, except for the first filtering unit 11a-1, the photosensitive element 131 can receive the signal light in the first wavelength band and the second wavelength band from the other first filtering units 11a and the second filtering units 11b.

Figure 6:
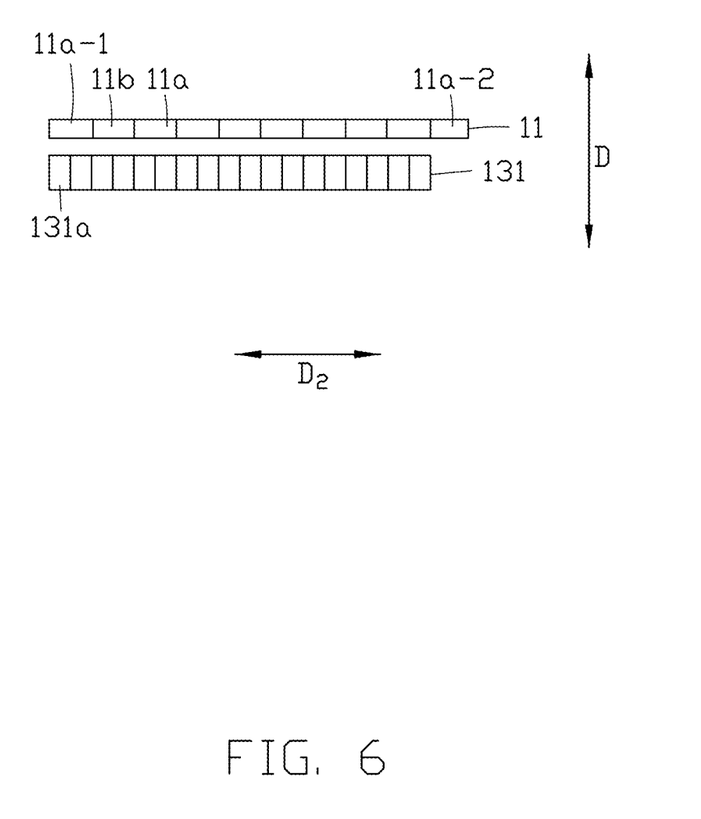
FIG. 6 shows a corresponding relationship between the filter and the photosensitive element when the filter on a second position.

As shown in FIG. 6, when the filter 11 is in the second position, a lest side of the first filtering unit 11a-2 is aligned with the right side of the photosensitive element 131, and a left side of the first filtering unit 11a-1 is aligned with the left side of the photosensitive element 131. That is, except for the first filtering unit 11a-2, the photosensitive element 131 can receive the signal light in the first wavelength band and the second wavelength band from the other first filtering units 11a and the second filtering units 11b.

Each pixel unit 131a of the photosensitive element 131 is used to convert the received signal light in the first wavelength band into a first electrical signal, and to convert the received signal light in the second wavelength band into a second electrical signal. The processing device 132 is used to generate images based on the first electrical signal and the second electrical signal, each image including a first part S1 and a second part S2.

Figure 5:
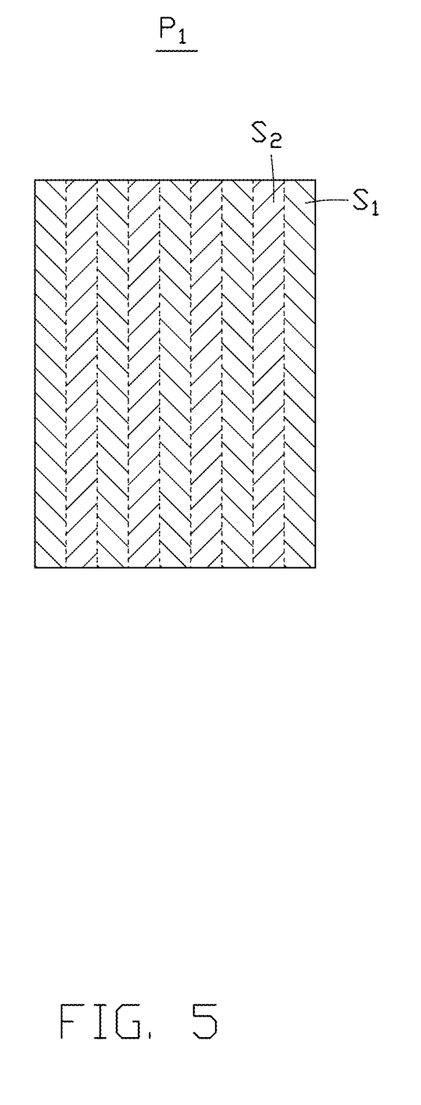
FIG. 5 is a schematic view of a first image generated by the imaging module during a first photosensitive period (when the filter on the first position).

As shown in FIG. 4 and FIG. 5, during a first photosensitive period of the imaging module 1, the processing device 132 generates a first image P1, wherein the first part $S_1$ of the first image $P_1$ is generated based on the first electrical signal, and the second part $S_2$ of the first image $P_1$ is generated based on the second electrical signal. That is, during the first photosensitive period, the first part $S_1$ corresponds to the first filtering units 11a of the filter 11 and is obtained based on the signal light in the first wavelength band and transmitted by the first filtering units 11a. The second part $S_2$ corresponds to the second filtering units 11b of the filter 11 and is obtained based on the signal light in the second wavelength band and transmitted by the second filtering units 11b.

Figure 7:
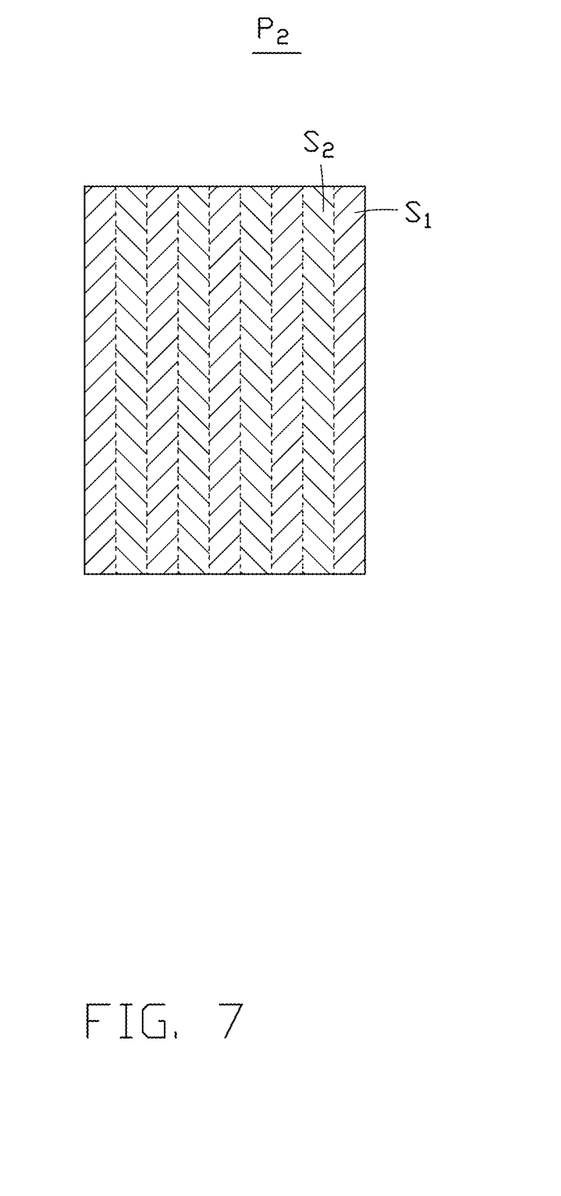
FIG. 7 is a schematic view of a first image generated by the imaging module during a second photosensitive period (when the filter on the second position).

As shown in FIG. 6 and FIG. 7, during a second photosensitive period of the imaging module 1, the processing device 132 generates a second image $P_2$, wherein the first part $S_1$ of the second image $P_2$ is generated based on the first electrical signal, and the second part $S_2$ of the second image $P_2$ is generated based on the second electrical signal. That is, during the second photosensitive period, the first part $S_1$ corresponds to the second filtering units 11b of the filter 11 and is obtained based on the signal light in the second wavelength band and transmitted by the second filtering units 11b. The second part $S_2$ corresponds to the first filtering units 11a of the filter 11 and is obtained based on the signal light in the first wavelength band and transmitted by the first filtering units 11a.

In at least one embodiment, the processing device 132 is used to remove the first part $S_1$ in the first image $P_1$ and the second part $S_2$ in the second image $P_2$ and combine the second part $S_2$ in the first image $P_1$ with the first part $S_1$ in the second image $P_2$ to finally generate a first target image. The first target image is generated based on the electrical signals corresponding to the signal light in the second wavelength band.

In at least one embodiment, the processing device 132 is used to remove the second part $S_2$ in the first image $P_1$ and the first part $S_1$ in the second image $P_2$ and combine the first part $S_1$ in the first image $P_1$ with the second part $S_2$ in the second image $P_2$ to finally generate a second target image. The second target image is generated based on the electrical signals corresponding to the signal light in the first wavelength band.

The following is an explanation of a working principle of the imaging module 1.

The imaging module 1 of the present embodiment works in multiple work cycles, each work cycle includes one first photosensitive period, one first interval period, one second photosensitive period, and one second interval period in sequence.

During each work cycle of the imaging module 1, the external ambient light is refracted and focused by the lens 10, and then received as the signal light by the filter 11.

As shown in FIG. 1, FIG. 4, and FIG. 5, during the first photosensitive period, the filter 11 is on the first position, wherein the first filtering units 11a (except for the first filtering unit 11a-1) and the second filtering units 11b are in a field of view of the lens 10 (i.e. on the light path of the ambient light). Each first filtering unit 11a in the field of view of the lens 10 transmits the light in the first wavelength band to propagate in a first space on a side of the filter 11 away from the lens 10, and each second filtering unit 11b in the field of view of the lens 10 transmits the light in the second wavelength band to propagate in a second space on the side of the filter 11 away from the lens 10. The first space and the second space are independent of each other, so that the pixel units 131a corresponding to the first space receives the signal light in the first wavelength band and converts the signal light in the first wavelength band into the first electrical signal, the pixel units 131a corresponding to the second space receives the signal light in the second wavelength band and converts the signal light in the second wavelength band into the second electrical signal. The processing device 132 generates the first image $P_1$ based on the first electrical signal and the second electrical signal. The first image $P_1$ includes the first part $S_1$ and the second part $S_2$. The first part $S_1$ of the first image $P_1$ is generated based on the first electrical signal, and the second part $S_2$ of the first image $P_1$ is generated based on the second electrical signal.

During the first interval between the first photosensitive period and the second photosensitive period, the driving element 12 synchronously drives the filter 11 to shift a distance equal to the length of the first short side $R_{S1}$ along the second direction $D_2$, so that the filter 11 switches from the first position to the second position. The first filtering unit 11a-1 is moved into the field of view of the lens 10, and the first filtering unit 11a-2 is moved out of the field of view of the lens 10. That is, the first filtering units 11a (except for the first filtering unit 11a-2) and the second filtering units 11b are in the field of view of the lens 10 (i.e., on the light path of the ambient light).

As shown in FIG. 1, FIG. 6, and FIG. 7, during the second photosensitive period, the filter 11 is on the second position, wherein the first filtering units 11a (except for the first filtering unit 11a-2) and the second filtering units 11b are in a field of view of the lens 10 (i.e. on the light path of the ambient light). Each first filtering unit 11a in the field of view of the lens 10 transmits the light in the first wavelength band to propagate in the second space on the side of the filter 11 away from the lens 10, and each second filtering unit 11b in the field of view of the lens 10 transmits the light in the second wavelength band to propagate in the first space on the side of the filter 11 away from the lens 10. The first space and the second space are independent of each other, so that the pixel units 131a corresponding to the first space receives the signal light in the second wavelength band and converts the signal light in the second wavelength band into the second electrical signal, the pixel units 131a corresponding to the second space receives the signal light in the first wavelength band and converts the signal light in the first wavelength band into the first electrical signal. The processing device 132 generates the second image $P_2$ based on the first electrical signal and the second electrical signal. The second image $P_2$ includes the first part $S_1$ and the second part $S_2$. The first part $S_1$ of the second image $P_2$ is generated based on the second electrical signal, and the second part $S_2$ of the second image $P_2$ is generated based on the first electrical signal.

During the second interval after the second photosensitive period, the driving element 12 drives the filter 11 to synchronously shift along an opposite direction to a displacement direction during the first interval period, making the filter 11 back to the first position.

In at least one embodiment, after generating the first image $P_1$ and the second image $P_2$ during each working cycle, the processing device 132 removes the first part $S_1$ of the first image $P_1$ and the second part $S_2$ of the second image $P_2$, and combine the first image $P_1$ (the first part $S_1$ removed) with the second image $P_2$ (the second part $S_2$ removed) to make the image generating component 13 finally generate the first target image. The first target image is generated based on the second electrical signal corresponding to the signal light in the second wavelength band.

In at least one embodiment, after generating the first image $P_1$ and the second image $P_2$ during each working cycle, the processing device 132 removes the second part $S_2$ of the first image $P_1$ and the first part $S_1$ of the second image $P_2$, and combine the first image $P_1$ (the second part $S_2$ removed) with the second image $P_2$ (the first part $S_1$ removed) to make the image generating component 13 finally generate the second target image. The second target image is generated based on the first electrical signal corresponding to the signal light in the first wavelength band.

Figure 8:
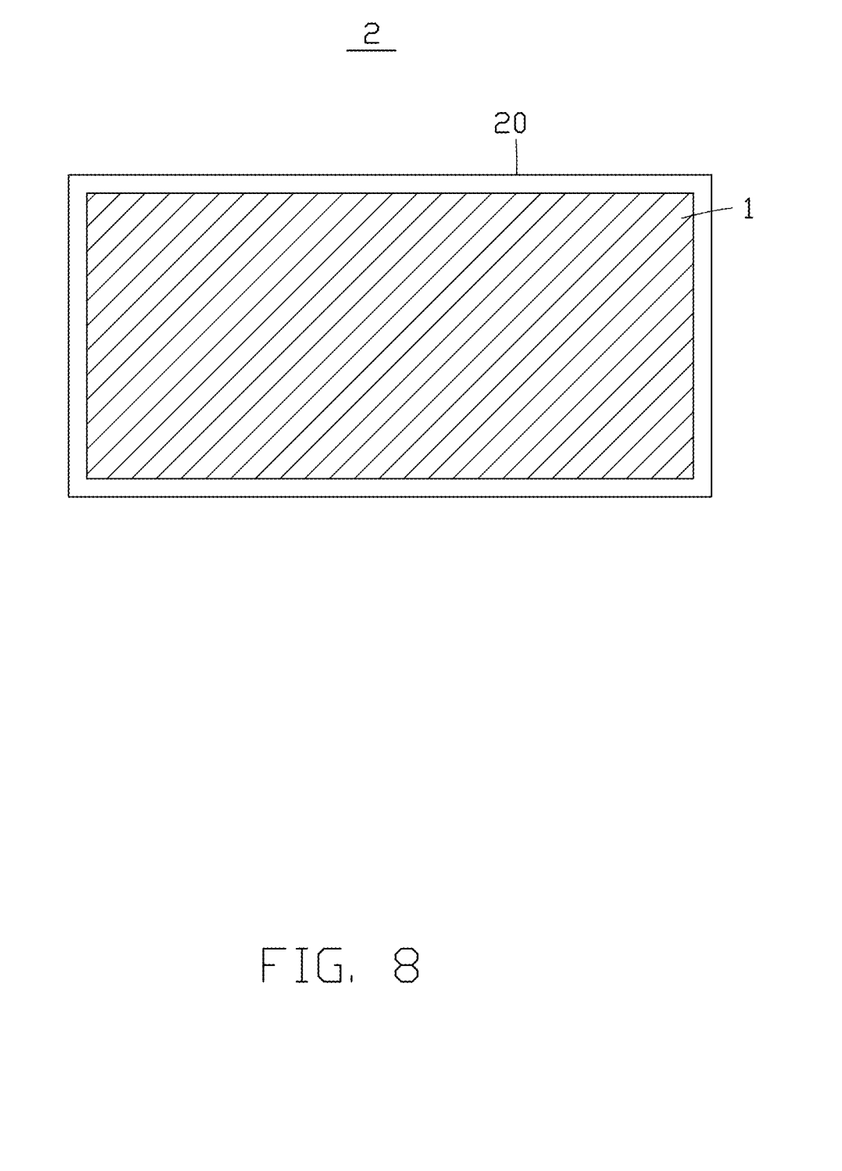
FIG. 8 is a schematic view of an imaging device according to an embodiment of the present disclosure.

As shown in FIG. 8, an imaging device 2 provided in the present embodiment includes a casing 20 and the imaging module 1 inside the casing 20. The lens 10 in the imaging module 1 is used to receive external ambient light to generate the signal light, and the filter 11 is used to transmit the light in the first wavelength band and the second wavelength band in the signal light. The driving element 12 is connected to the filter 11 and is used to drive the filter 11 to synchronously move, which changes a space of the light in the first wavelength band and the second wavelength band on a side of the filter 11 emitting the signal light. The image generating component 13 is used to generate images based on the signal light in the first wavelength band and the second wavelength band.

In summary, the imaging module 1 and the imaging device 2 of the present embodiment have the following beneficial effects:

The ambient light is refracted and focused by the lens 10, and then received as the signal light by the filter 11. The filter 11 includes the first filtering units 11a and the second filtering units 11b. Each first filtering unit 11a transmits the signal light in the first wavelength band, and each second filtering unit 11b transmits the signal light in the second wavelength band. The filter 11 is connected to the driving element 12, and the driving element 12 is used to drive the filter 11 to move, thereby switching the positions of the filter 11.

The propagating spaces of c change with the movement of the filter 11, which makes different areas of the photosensitive element 131 to receive the signal light in the first wavelength band and the second wavelength band accordingly. That is, different pixel units 131a of the photosensitive element 131 are used to receive the signal light in the first band when the filter 11 in different positions, and different pixel units 131a of the photosensitive element 131 are used to receive the signal light in the second band when the filter 11 in different positions. Therefore, each pixel unit 131a of the photosensitive element 131 is used to receive signal light with different wavelengths during different periods by switching the position of the filter 11. That is, by switching the position of the filter 11, each pixel unit 131a of the photosensitive element 131 can receive the signal light in both the first wavelength band and the second wavelength band.

The processing device 132 is used to generate two types of images based on the signal light in the first wavelength band and the second wavelength band, and distinguishes the electrical signals corresponding to the two types of images to generate the first target image corresponding to the signal light in the first wavelength band and the second target image corresponding to the second wavelength band. In at least one embodiment, the signal light in the first wavelength band is infrared light, the signal light in the second wavelength band is visible light, the first target image is generated based on the electrical signal generated by the infrared light, and the second target image is generated based on the electrical signal generated by the visible light.

The imaging module 1 can choose to obtain the first target image and/or the second target image in different occasions. The imaging module 1 is used to obtain visible light images when in a bright environment, so that users can intuitively obtain image information. Due to the strong penetration and transparency of infrared light, the imaging module 1 is used to obtain infrared light images when in a dim or nighttime environment, so that the users can observe changes of the environment even under poor lighting conditions. In addition, the imaging module 1 can obtain visible light images and infrared light images in various environments to improve the user's usability.

The imaging module 1 of this disclosure generates the first target image and the second target image by switching the positions of the filter 11, and the filter 11 is only moved by the distance equal to the length of the first short side of the first filtering unit 11a. That is, only a small space (a space that can accommodate one first filtering unit 11a or one second filtering unit 11b) needs to be reserved inside the imaging module 1 for the filter 11 to move. Compared to moving an entire filter, the imaging module 1 of this disclosure requires less reserved space, which is beneficial for reducing a volume of the imaging module 1. In addition, moving by the distance equal to the length of the first short side of the first filtering unit 11a is beneficial for reducing noise and a failure risk.

Finally, it should be noted that the above embodiments are only used to illustrate the technical solution of the present application and not to limit the present application. Although the present application has been described in detail with reference to preferred embodiments, one ordinary skill in the art should understand that the technical solution of the present application can be modified or equivalent replaced without departing from the spirit and scope of the technical solution of the present application.

What is claimed is:

1. An imaging module comprising:
   a lens for receiving ambient light and emitting signal light;

a filter on a light path of the signal light, the filter comprising a plurality of first filtering units and a plurality of second filtering units, surfaces of each of the plurality of first filtering units and each of the plurality of second filtering units for receiving the ambient light have rectangular planar structures, each of the plurality of first filtering units alternately connected with one of the plurality of second filtering units along an extension direction of a short side, and each of the plurality of first filtering units being configured to transmit light in a first wavelength band in the signal light, and each of the plurality of second filtering units being used to transmit light in a second wavelength band in the signal light;

a driving element connected to the filter and configured to drive the filter to shift in a direction perpendicular to the light path of the signal light to change positions of the filter, to switch different first filtering units and different second filtering units into the light path of the signal light during different periods; and an image generating component comprising a photosensitive element comprising a plurality of pixel units, wherein surfaces of each of the plurality of pixel units for receiving the signal light have a rectangular planar structure, a length of a short side of each of the plurality of first filtering units and each of the plurality of second filtering units equal to a length of at least one short side of the plurality of pixel units, and a length of a long side of each of the plurality of first filtering units and each of the plurality of second filtering units equal to a length of the long side of the photosensitive element.

2. The imaging module according to claim 1, wherein the light in the first wavelength band is infrared light, and the light in the second wavelength band is visible light.

3. The imaging module according to claim 1, wherein the plurality of first filtering units and the plurality of second filtering units have a same length of long side and a same length of short side.

4. The imaging module according to claim 3, wherein the driving element is between the lens and the image generating component and is securely connected to the filter; and
the driving element is configured to drive the filter to synchronously shift with the driving element in the extension direction of the short side.

5. The imaging module according to claim 4, wherein the imaging module works in a plurality of working cycles, each of the plurality of work cycles comprises a first photosensitive period, a first interval period, a second photosensitive period, and a second interval period in sequence; and
the driving element is configured to synchronously drive the filter to shift during the first interval period and the second interval period, and a movement distance of the driving element during the first interval period and the second interval period equals to the length of the short side of each of the plurality of first filtering units.

6. The imaging module according to claim 5, wherein during the first photosensitive period, the filter is in a first position, the light in the first wavelength band propagates in a first space on a side of the filter emitting the signal light, and the light in the second wavelength band propagates in a second space on the side of the filter emitting the signal light;
during the first interval period between the first photosensitive period and the second photosensitive period, the driving element synchronously drives the filter to shift by a distance equal to the length of the short side of each of the plurality of first filtering units, and the filter switches from the first position to a second position;
during the second photosensitive period, the filter is in the second position, the light in the first wavelength band propagates in the second space on the side of the filter emitting the signal light, and the light in the second wavelength band propagates in the first space on the side of the filter emitting the signal light; and
during the second interval period after the second photosensitive period, the driving element drives the filter shift along a direction opposite to a shift direction during the first interval period, and the filter is shift back to the first position.

7. The imaging module according to claim 6, wherein:
during the first photosensitive period, a portion of the plurality of pixel units corresponding to the first space receive the light in the first wavelength band and convert the light in the first wavelength band into a first electrical signal, and the other portion of the plurality of pixel units corresponding to the second space receive the light in the second wavelength band and convert the light in the second wavelength band into a second electrical signal;
during the second photosensitive period, a portion of the plurality of pixel units corresponding to the first space receive the light in the second wavelength band and convert the light in the second wavelength band into a second electrical signal, and the other portion of the plurality of pixel units corresponding to the second space receive the light in the first wavelength band and convert the light in the first wavelength band into a first electrical signal;
the processing device is configured to generate a first image based on the first electrical signal and the second electrical signal during the first photosensitive period, and to generate a second image based on the first electrical signal and the second electrical signal during the second photosensitive period; and
the processing device is further configured to remove a part of the first image and a part of the second image generated according to the first electrical signal, and combine the first image with the second image to generate a first target image based on electrical signal corresponding to the light in the second wavelength band; or the processing device is further configured to remove a part of the first image and a part of the second image generated according to the second electrical signal, and combine the first image with the second image to generate a second target image based on electrical signal corresponding to the light in the first wavelength band.

8. The imaging module according to claim 4, wherein the image generating component is on a side of the driving element away from the lens and further comprising a processing device, the photosensitive element is electrically connected to the processing device, the photosensitive element is configured to convert the light in the first wavelength band and the light in the second wavelength band into electrical signals, and the processing device is configured to convert the electrical signals into a first target image or a second target image.

9. A imaging device comprising:
a casing; and
an imaging module inside the casing and comprising:
a lens for receiving ambient light and emitting signal light;

a filter on a light path of the signal light, the filter comprising a plurality of first filtering units and a plurality of second filtering units, surfaces of each of the plurality of first filtering units and each of the plurality of second filtering units for receiving the ambient light have rectangular planar structures, each of the plurality of first filtering units alternately connected with one of the plurality of second filtering units along an extension direction of a short side, and each of the plurality of first filtering units being configured to transmit light in a first wavelength band in the signal light, and each of the plurality of second filtering units being used to transmit light in a second wavelength band in the signal light;

a driving element connected to the filter and configured to drive the filter to shift in a direction perpendicular to the light path of the signal light to change positions of the filter, and switch different first filtering units and different second filtering units to the light path of the signal light during different periods; and an image generating component comprising a photosensitive element comprising a plurality of pixel units, wherein surfaces of each of the plurality of pixel units for receiving the signal light have a rectangular planar structure, a length of a short side of each of the plurality of first filtering units and each of the plurality of second filtering units equal to a length of at least one short side of the plurality of pixel units, and a length of a long side of each of the plurality of first filtering units and each of the plurality of second filtering units equal to a length of the long side of the photosensitive element.

10. The imaging device according to claim 9, wherein the light in the first wavelength band is infrared light, and the light in the second wavelength band is visible light.

11. The imaging device according to claim 9, wherein the plurality of first filtering units and the plurality of second filtering units have a same length of long side and a same length of short side.

12. The imaging device according to claim 11, wherein the driving element is between the lens and the image generating component and is fixedly connected to the filter; and the driving element is configured to drive the filter to synchronously shift in the extension direction of the short side.

13. The imaging device according to claim 12, wherein the imaging module works in a plurality of working cycles, each of the plurality of work cycles comprises a first photosensitive period, a first interval period, a second photosensitive period, and a second interval period in sequence; and the driving element is configured to synchronously drive the filter to shift during the first interval period and the second interval period, and a movement distance of the driving element during the first interval period and the second interval period equals to the length of the short side of each of the plurality of first filtering units.

14. The imaging device according to claim 13, wherein during the first photosensitive period, the filter is in a first position, the light in the first wavelength band propagates in a first space on a side of the filter emitting the signal light, and the light in the second wavelength band propagates in a second space on the side of the filter emitting the signal light;

during the first interval period between the first photosensitive period and the second photosensitive period, the driving element synchronously drives the filter to shift by a distance equals to the length of the short side of each of the plurality of first filtering units, and the filter switches from the first position to a second position;

during the second photosensitive period, the filter is in the second position, the light in the first wavelength band propagates in the second space on the side of the filter emitting the signal light, and the light in the second wavelength band propagates in the first space on the side of the filter emitting the signal light; and during the second interval period after the second photosensitive period, the driving element drives the filter shift along a direction opposite to a shift direction during the first interval period, and the filter is shift back to the first position.

15. The imaging device according to claim 14, wherein:

during the first photosensitive period, a portion of the plurality of pixel units corresponding to the first space receive the light in the first wavelength band and convert the light in the first wavelength band into a first electrical signal, and the other portion of the plurality of pixel units corresponding to the second space receive the light in the second wavelength band and convert the light in the second wavelength band into a second electrical signal;

during the second photosensitive period, a portion of the plurality of pixel units corresponding to the first space receive the light in the second wavelength band and convert the light in the second wavelength band into a second electrical signal, and the other portion of the plurality of pixel units corresponding to the second space receive the light in the first wavelength band and convert the light in the first wavelength band into a first electrical signal;

the processing device is configured to generate a first image based on the first electrical signal and the second electrical signal during the first photosensitive period, and to generate a second image based on the first electrical signal and the second electrical signal during the second photosensitive period; and the processing device is further configured to remove a part of the first image and a part of the second image generated according to the first electrical signal, and combine the first image with the second image to generate a first target image based on electrical signal corresponding to the light in the second wavelength band; or the processing device is further configured to remove a part of the first image and a part of the second image generated according to a second electrical signal, and combine the first image with the second image to generate the second target image based on electrical signal corresponding to the light in the first wavelength band.

16. The imaging device according to claim 13, wherein the image generating component is on a side of the driving element away from the lens and further comprise a processing device, the photosensitive element is electrically connected to the processing device, the photosensitive element is configured to convert the light in the first wavelength band and the light in the second wavelength band into electrical signals, and the processing device is configured to convert the electrical signals into a first target image or a second target image.

* * * * *